United States Patent
Wirth et al.

(10) Patent No.: US 8,780,246 B2
(45) Date of Patent: Jul. 15, 2014

(54) METHOD FOR CORRECTING IMAGES OBTAINED BY AN ARRAY OF PHOTOSENSITIVE POINTS

(75) Inventors: Thibaut Wirth, Moirans (FR); Benoit Candiard, Fontanil-Cornillon (FR); Jean-Michel Vignolle, St Jean de Moirans (FR)

(73) Assignee: Trixell S.A.S., Moirans (FR)

( * ) Notice: Subject to any disclaimer, the term of this patent is extended or adjusted under 35 U.S.C. 154(b) by 329 days.

(21) Appl. No.: 13/147,960

(22) PCT Filed: Dec. 9, 2009

(86) PCT No.: PCT/EP2009/066683
§ 371 (c)(1),
(2), (4) Date: Oct. 13, 2011

(87) PCT Pub. No.: WO2010/088989
PCT Pub. Date: Aug. 12, 2010

(65) Prior Publication Data
US 2012/0033112 A1 Feb. 9, 2012

(30) Foreign Application Priority Data
Feb. 6, 2009 (FR) ...................................... 09 50771

(51) Int. Cl.
*H04N 5/335* (2011.01)
(52) U.S. Cl.
USPC .......................................... 348/296; 348/297
(58) Field of Classification Search
USPC .................... 348/294, 296, 297, 298, 364
See application file for complete search history.

(56) References Cited

U.S. PATENT DOCUMENTS 5,276,508 A 1/1994 Boisvert et al.
(Continued)

FOREIGN PATENT DOCUMENTS

| FR | 2605166 A1 | 4/1988 |
| FR | 2760585 A1 | 9/1998 |

OTHER PUBLICATIONS

Irsigler R; Andersson J; Alverbro J; Fakoor-Biniaz Z; Frojdh C; Helander P; Martijn H; Meikle D; Ostlund M; O'Shea V; Smith L: "320x240 GaAs pixel detectors with improved X-ray imaging quality," Nuclear Instruments & Methods in Physics Research, Section—A: Accelerators, Spectrometers, Detectors and Associated Equipment, Elsevier, Amsterdam, NL, vol. 460, No. 1, Mar. 11, 2001, pp. 67-71.

(Continued)

*Primary Examiner* — Tuan Ho
(74) *Attorney, Agent, or Firm* — Baker Hostetler LLP

(57) ABSTRACT

A method for correcting an image obtained by a matrix of photosensitive points finds particular utility when the matrix is subjected to an electromagnetic disturbance. The method of correction comprises a first step of row-by-row reading of the matrix. The signals read during a first reading of each row represent the charges accumulated subsequent to exposure of the matrix to luminous radiation and make it possible to form, for each column of the matrix, a discrete signal. The signals read during a second reading represent the charges accumulated in the absence of exposure and form, for each column of the matrix, a discrete signal. In a second step of the method, a signal corresponding substantially to the signal which would have been formed at the time of the first reading in the absence of exposure is determined. In a third step, the signal is subtracted column by column from the signal.

4 Claims, 5 Drawing Sheets

(56) References Cited

U.S. PATENT DOCUMENTS

| | | |
|---|---|---|
| 2007/0236590 A1 | 10/2007 | Harris |
| 2009/0147117 A1* | 6/2009 | Suzuki et al. ............... 348/294 |
| 2010/0149385 A1* | 6/2010 | Tay .............................. 348/241 |
| 2011/0050969 A1* | 3/2011 | Nishihara ..................... 348/296 |

OTHER PUBLICATIONS

Jung M; Reibel Y; Cunin B; Draman C: "RDS and IRDS Filters for High-Speed CCD Video Sensors," IEEE Transactions on Circuits and Systems II: Express Briefs, IEEE Service Center, New York, NY, US, vol. 47, No. 9, Sep. 1, 2000.

* cited by examiner

METHOD FOR CORRECTING IMAGES OBTAINED BY AN ARRAY OF PHOTOSENSITIVE POINTS

CROSS-REFERENCE TO RELATED APPLICATIONS

This application is a National Stage of International patent application PCT/EP2009/066683, filed on Dec. 9, 2009, which claims priority to foreign French patent application No. FR 09 50771, filed on Feb. 6, 2009, the disclosures of which are incorporated by reference in their entirety.

FIELD OF THE INVENTION

The invention relates to a method for correcting an image obtained by a photosensitive device comprising a matrix of photosensitive points, which are produced for example by techniques for depositing semi-conducting materials. It applies essentially, but not exclusively, to photosensitive devices used for the detection of radiological images. The invention finds particular utility when the photosensitive device is subjected to an electromagnetic disturbance.

BACKGROUND OF THE INVENTION

The techniques of thin-film deposition of semi-conducting materials such as hydrogenated amorphous silicon (aSiH), on glass insulating supports for example, make it possible to construct matrices of photosensitive points that can produce an image on the basis of visible or near-visible radiation. These matrices can nonetheless be used within the framework of the detection of radiological images. For this purpose, it suffices to interpose a scintillator screen between the X-ray radiation and the matrix so as to convert the X-ray radiation into luminous radiation in the band of wavelengths to which the photosensitive points are sensitive.

The photosensitive points which form these matrices generally comprise a photosensitive element associated with an element fulfilling an on/off switch function. The photosensitive point is mounted between a row conductor and a column conductor. Depending on requirements, the photosensitive device then comprises a plurality of photosensitive points laid out as a matrix or a strip.

The photosensitive element commonly consists of a diode, mounted in series with the on/off switch element. The on/off switch element may be for example a so-called switching diode whose "closed" or "passing" state corresponds to the bias which turns it on in forward mode, and whose "open" or "blocked" state corresponds to its reverse bias. The two diodes are mounted with opposite directions of conduction, in a so-called "head-to-tail" configuration. Such an arrangement is well known, notably from French patent application 86 14058 (publication No. 2 605 166) wherein are described a matrix of photosensitive points of the type with two diodes in "head-to-tail" configuration, a method for reading the photosensitive points and a way of constructing a photosensitive device such as this. The amorphous semi-conducting material shows some memory effect. This is related to its amorphous structure which comprises a large number of traps, many more than in crystalline materials. These traps are structural defects which extend over the whole of the forbidden band. They retain charges engendered during a useful image capture, in particular during exposure of the photosensitive points to luminous radiation. The material memorizes an image corresponding to a given luminous radiation and restores charges relating to this image in the course of the reading of the following image or indeed of several following images. The quality of the images enjoys the effects thereof.

Moreover, the semi-conductor components used in a matrix or a strip of photosensitive points are not all identical and the photosensitive device into which this matrix or this strip is integrated then inherently possesses inhomogeneities which result in impaired zones which vary over time.

To try to obtain a useful image of optimal quality, a correction of the useful image is performed on the basis of a so-called offset image (known in the corresponding French terminology as a black image), captured for example at the start of an operating cycle or subsequent to a useful image capture. This offset image is the image obtained while the photosensitive device is exposed to a signal of zero intensity and corresponds to a sort of background image. The offset image varies as a function of the electrical state of the components of the photosensitive points and of the dispersion of their electrical characteristics. The useful image is that read while the photosensitive device has been exposed to a useful signal which corresponds for example to an exposure of the scintillator to X-ray radiation. It encompasses the offset image. The correction of the useful image then consists in performing a subtraction of the offset image from the useful image. This correction is reliable only if the offset image has not varied between the moment at which it was captured and the moment at which the useful image is captured. This implies that the photosensitive points are in the same electrical state just before the offset image is captured and just before the useful image is captured.

However, the photosensitive points are generally sensitive to electromagnetic disturbances. In certain cases of use of the photosensitive device, electromagnetic disturbances are inevitable. This is the case for example when the photosensitive device is used simultaneously with an electric bistoury within the framework of interventional radiography. Consequently, the electrical state of the photosensitive points may vary between useful image capture and offset image capture. If the disturbance is permanent and periodic, strips can appear on the image formed by the photosensitive device, unless the frequency of the electromagnetic disturbance is very slow compared with the image capture frequency.

To decrease the impact of electromagnetic disturbances on the images formed by a photosensitive device, it is possible to render the photosensitive device insensitive to these disturbances, notably by designing a shielding and by removing the current loops. However, this is not always possible in the presence of heavy constraints, for example mechanical (weight, size) or electrical (insulation). It is also possible to synchronize the image captures with the disturbance so as to subtract, by way of the offset image, the same amplitude of disturbance as at the moment of useful image capture. This synchronization is possible only in the presence of a single electromagnetic disturbance or optionally in the presence of several electromagnetic disturbances whose frequencies are multiples of one another. Furthermore, it is necessary to characterize the disturbance and to precisely sequence the control of the photosensitive device as a function of this disturbance, thereby imposing numerous constraints on the design of the photosensitive device. A third solution consists in correcting the image obtained by filtering, for example by means of image correction software. Filtering may, however, lead to the loss or modification of medical information. Moreover, it is difficult to adapt it to a wide spectrum of frequencies of electromagnetic disturbances.

SUMMARY OF THE INVENTION

An aim of the invention is notably to alleviate all or some of the aforementioned drawbacks by proposing a method making it possible to correct an image obtained by a photosensitive device of the impact of any type of electromagnetic disturbance without adding any constraint in the design of the photosensitive device. For this purpose, the subject of the invention is a method for correcting an image obtained by a photosensitive device comprising photosensitive points organized as a matrix of Nl rows by Nc columns. Each photosensitive point is able to accumulate charges during exposure to luminous radiation. According to the invention, the method comprises:

a first step of row-by-row reading at instants t=2n and t=2n+1 of signals representative of the charges accumulated at each photosensitive point with n an integer lying between 0 and N−1, where N is an integer lying between 2 and the number Nl of rows of the matrix, the signals of one and the same row being read simultaneously, a determined duration $T_{sampling}$ separating two successive reading instants, the signals that are read at the instants t=2n, called useful signals, representing the charges accumulated at the various photosensitive points subsequent to exposure of these points to useful luminous radiation, the signals that are read at the instants t=2n+1, called offset signals, representing the charges accumulated at the various photosensitive points in the absence of exposure to radiation, for each column of the matrix, the useful signals forming a discrete signal $X_{real}(n)$ and the offset signals forming a discrete signal $OF(n)$, a second step of determining, for each signal $OF(n)$ corresponding to a column of the matrix, a signal $OFX(n)$ which would have been formed by the offset signals if they had been read at the instants t=2n, these signals $OFX(n)$ being determined by correcting the signals $OF(n)$, a third step of subtracting, for each column of the matrix, the signal $OFX(n)$ from the corresponding signal $X_{real}(n)$.

The invention makes it possible to effectively correct an image obtained by a matrix of photosensitive points subjected to an electromagnetic disturbance, in particular when this disturbance is permanent and periodic.

BRIEF DESCRIPTION OF THE DRAWINGS

The invention will be better understood and other advantages will become apparent on reading the detailed description of a mode of implementation given by way of example, which description is offered in relation to appended drawings which represent.

DETAILED DESCRIPTION

Figure 1:
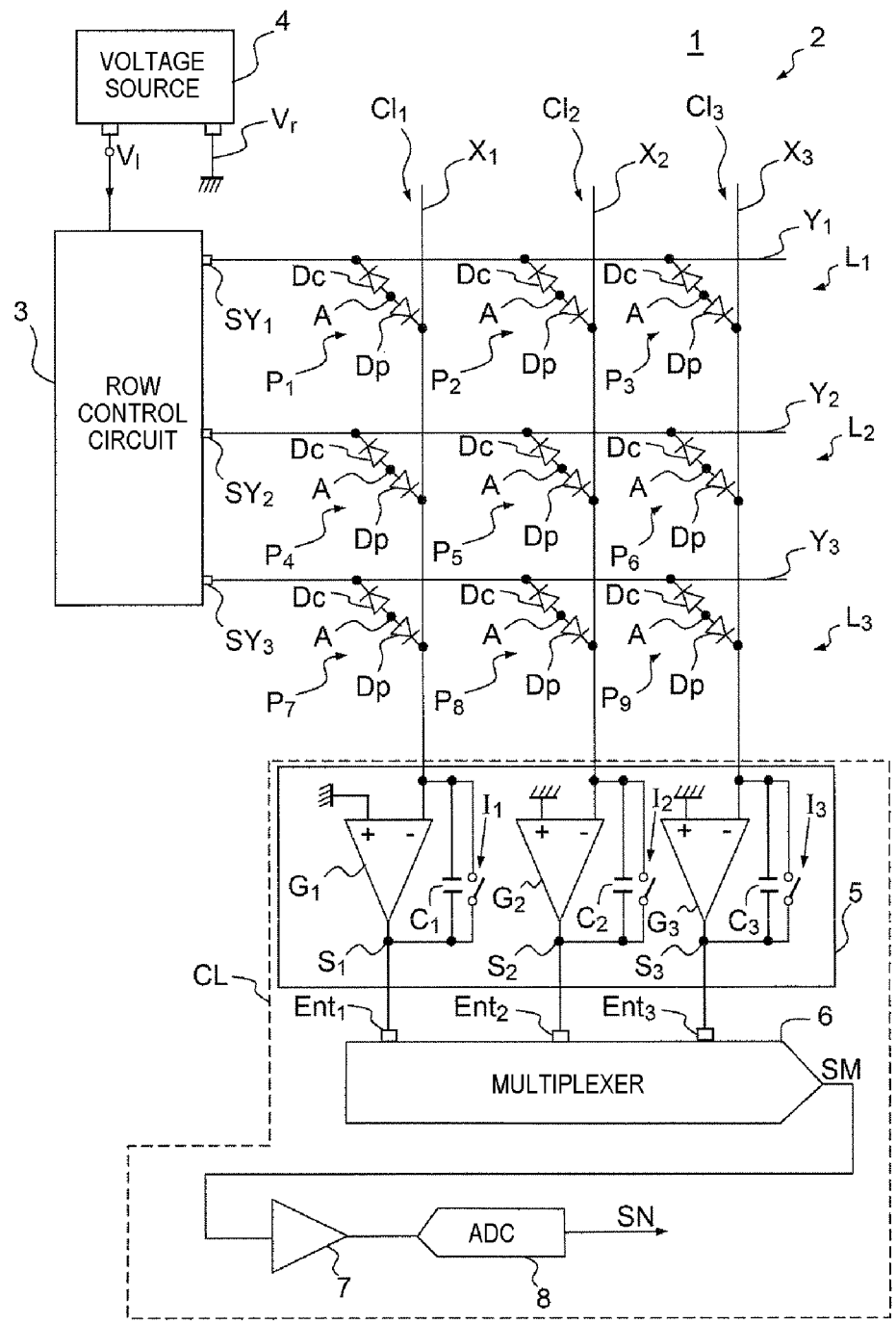
FIG. 1, a first exemplary passive photosensitive device to which the invention may be applied.

FIG. 1 represents a simplified diagram of a photosensitive device 1 comprising a matrix 2 organized in a conventional manner. The matrix 2 comprises photosensitive points $P_1$ to $P_9$, each formed by a photosensitive diode Dp and a switching diode Dc mounted in series in accordance with a head-to-tail configuration. The matrix comprises row conductors $Y_1$ to $Y_3$ crossed with column conductors $X_1$ to $X_3$, with at each crossover, a photosensitive point $P_1$ to $P_9$ connected between a row conductor $Y_1$ to $Y_3$ and a column conductor $X_1$ to $X_3$. The photosensitive points $P_1$ to $P_9$ are thus arranged in rows $L_1$ to $L_3$ and columns $Cl_1$ to $Cl_3$. They are also called pixels.

In the example of FIG. 1, only three rows and three columns are represented which define nine photosensitive points $P_1$ to $P_9$, but such a matrix can have a much larger capacity, of possibly as much as several million points. It is common for example to construct such matrices having photosensitive points arranged in 3000 rows and 3000 columns (in an area of the order of 40 cm×40 cm), or else arranged in a single column and several rows so as to constitute a detection strip.

The photosensitive device 1 comprises a row control circuit 3, outputs $SY_1$, $SY_2$ and $SY_3$ of which are linked respectively to the row conductors $Y_1$, $Y_2$ and $Y_3$. The row control circuit 3 has various elements, not represented, such as for example, clock circuit, switching circuits, shift register, which allow it to carry out sequential addressing of the row conductors $Y_1$ to $Y_3$. The photosensitive device 1 furthermore comprises a voltage source 4, delivering to the row control circuit 3 a voltage $V_l$ serving to define the amplitude of so-called reading pulses applied to the row conductors $Y_1$ to $Y_3$.

In each photosensitive point $P_1$ to $P_9$, the two diodes Dp and Dc are linked together either by their anode, as represented in FIG. 1, or by their cathode. The cathode of the photodiode Dp is linked to a column conductor $X_1$ to $X_3$, and the cathode of the switching diode Dc is linked to a row conductor $Y_1$ to $Y_3$. It should be noted that generally the two diodes Dp and Dc are designed so that the capacitance exhibited by the photodiode Dp is the highest, of the order for example of 50 times.

During a phase of exposure of the matrix 2 to so-called "useful" luminous radiation, the two diodes Dp and Dc of each photosensitive point $P_1$ to $P_9$ are reverse biased. In this state, they each constitute a capacitor. Charges are generated in the photodiode Dp by the exposure of the photosensitive point $P_1$ to $P_9$ to which it belongs. These charges, the quantity of which is dependent on the exposure intensity, accumulate at a point A on the node formed at the junction point of the two diodes Dp and Dc. The reading of the photosensitive points $P_1$ to $P_9$ is performed row by row, simultaneously for all the photosensitive points linked to one and the same row conductor $Y_1$ to $Y_3$. For this purpose, the row control circuit 3 applies to each row conductor $Y_1$ to $Y_3$ addressed, a reading pulse of a given amplitude. The row conductors which are not addressed are maintained at a reference potential $V_r$ or rest potential. This reference potential $V_r$ is for example ground. It may be the same potential as that which is applied to the column conductors $X_1$ to $X_3$.

The accumulation, if any, of charges at the point A of a photosensitive point $P_1$ to $P_9$ causes a decrease in the voltage at this point, that is to say a decrease in the reverse bias voltage of the photodiode Dp. The effect of applying a reading pulse to a row conductor $Y_1$ to $Y_3$ is to restore to the potential of the point A of all the photosensitive points linked to this row conductor, the bias level that it possessed before exposure to the useful luminous radiation. This results in a flow in each of the column conductors $X_1$ to $X_3$ of a current proportional to the charges accumulated at the corresponding point A.

The column conductors $X_1$ to $X_3$ are linked to a reading circuit CL comprising, in the example of FIG. 1, an integrator circuit 5, a multiplexer circuit 6, a video amplifier 7 and an analogue-digital converter 8. The integrator circuit 5 comprises as many amplifiers as column conductors $X_1$ to $X_3$ i.e., in the example of FIG. 1, three amplifiers $G_1$ to $G_3$. It furthermore comprises an integration capacitor $C_1$ to $C_3$ and an on/off switch element $I_1$ to $I_3$ for each amplifier $G_1$ to $G_3$. Each column conductor $X_1$ to $X_3$ is linked to a negative input "−" of an amplifier $G_1$ to $G_3$ mounted as an integrator. An integration capacitor $C_1$ to $C_3$ is mounted between the negative input "−" and an output $S_1$ to $S_3$ of each amplifier. A second input "+" of each amplifier $G_1$ to $G_3$ is linked to a potential which, in the example of FIG. 1, is the reference potential $V_r$. Accordingly, this potential is imposed on all the column conductors $X_1$ to $X_3$. A so-called reset-to-zero on/off switch element $I_1$ to $I_3$ is mounted in parallel with each integration capacitor $C_1$ to $C_3$. The on/off switch elements $I_1$ to $I_3$ are for example transistors of the MOS type. The integrator circuit 5 thus transforms the charges flowing on the column conductors $X_1$ to $X_3$ into voltages.

The outputs $S_1$ to $S_3$ of the amplifiers $G_1$ to $G_3$ are linked to inputs $Ent_1$ to $Ent_3$ of the multiplexer circuit 6. The multiplexer circuit 6 is for example formed of a shift register with parallel inputs and serial output that may be of the charge coupling type, more commonly called C.C.D. standing for the expression "Charged-Coupled Device". This conventional arrangement makes it possible to deliver "in series" and row after row (from $L_1$ to $L_3$), at the output of the multiplexer 6, voltages which represent the charges accumulated at the points A of all the photosensitive points $P_1$ to $P_9$. These voltages are called the multiplexed signal SM.

The multiplexed signal SM can thereafter be amplified by the video amplifier 7 and converted into a digital signal SN by an analogue-digital converter 8.

It should be noted that it is also known, in order to fulfil the on/off switch function which, in the example of FIG. 1, is held by the switching diode Dc, to use a transistor. The latter exhibits greater connection complexity as compared with the diode, but it offers advantages in the quality of its "on" state.

Figure 2:
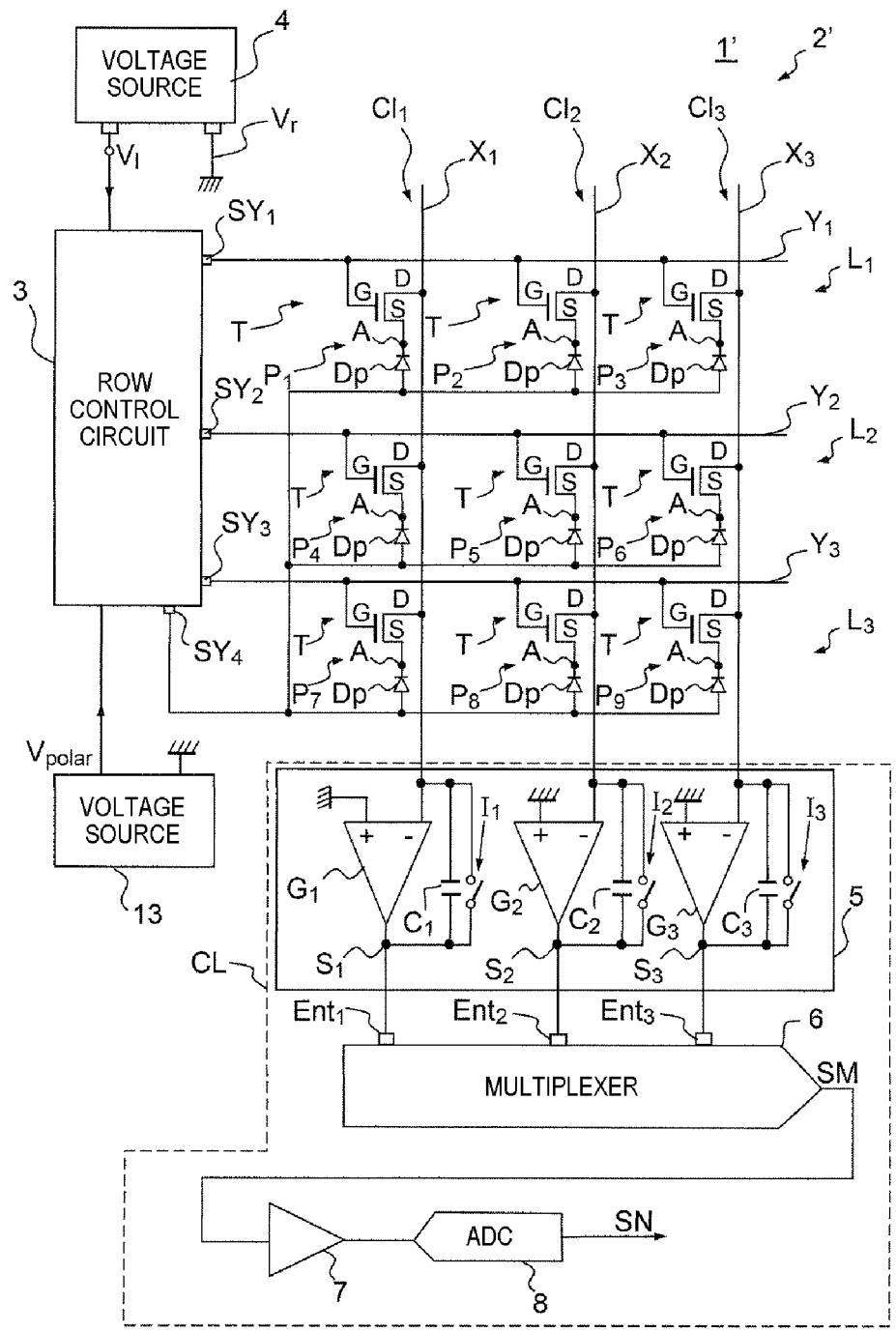
FIG. 2, a second exemplary passive photosensitive device to which the invention may be applied.

FIG. 2 schematically illustrates a photosensitive device 1' which differs from that of FIG. 1 mainly in that it comprises a matrix 2' in which the switching diodes Dc are replaced with transistors T, for example constructed by techniques for depositing films in thin layers. These techniques are known in the literature by the term "Thin Film Transistor" (TFT). These techniques may be used to construct the set of matrices 2 and 2' represented in FIGS. 1 and 2.

In the diagram shown in FIG. 2 by way of example, in each photosensitive point $P_1$ to $P_9$, the transistor T is linked by its source S to the cathode of the photodiode Dp, that is to say to the point A, its gate G is linked to the row conductor $Y_1$ to $Y_3$ to which the photosensitive point $P_1$ to $P_9$ belongs and its drain D is linked to the column conductor $X_1$ to $X_3$ to which the photosensitive point $P_1$ to $P_9$ belongs. The anodes of all the photodiodes Dp are linked to an output $SY_4$ of the row control circuit 3. The output $SY_4$ delivers a so-called bias voltage $V_{bias}$, which is negative with respect to the reference potential $V_r$, or ground, of the order for example of −5 volts. This bias voltage $V_{bias}$ serves to constitute the reverse bias of the photodiodes Dp. The row control circuit 3 receives for example this bias voltage from a power supply source 13.

For a better understanding of the general operation of the devices represented in FIGS. 1 and 2, reference may be made to the French patent applications published under the numbers FR 2 760 585 and FR 2 605 166.

FIGS. 1 and 2 describe exemplary modes of implementation of photosensitive devices 1 and 1' in which the photosensitive points $P_1$ to $P_9$ are said to be passive. However, the invention applies particularly well to photosensitive devices in which the photosensitive points are said to be active, that is to say photosensitive points in which the charges accumulated during an image acquisition phase are converted into voltages at the level of the pixels and not outside the matrix in an integrator circuit.

Figure 3:
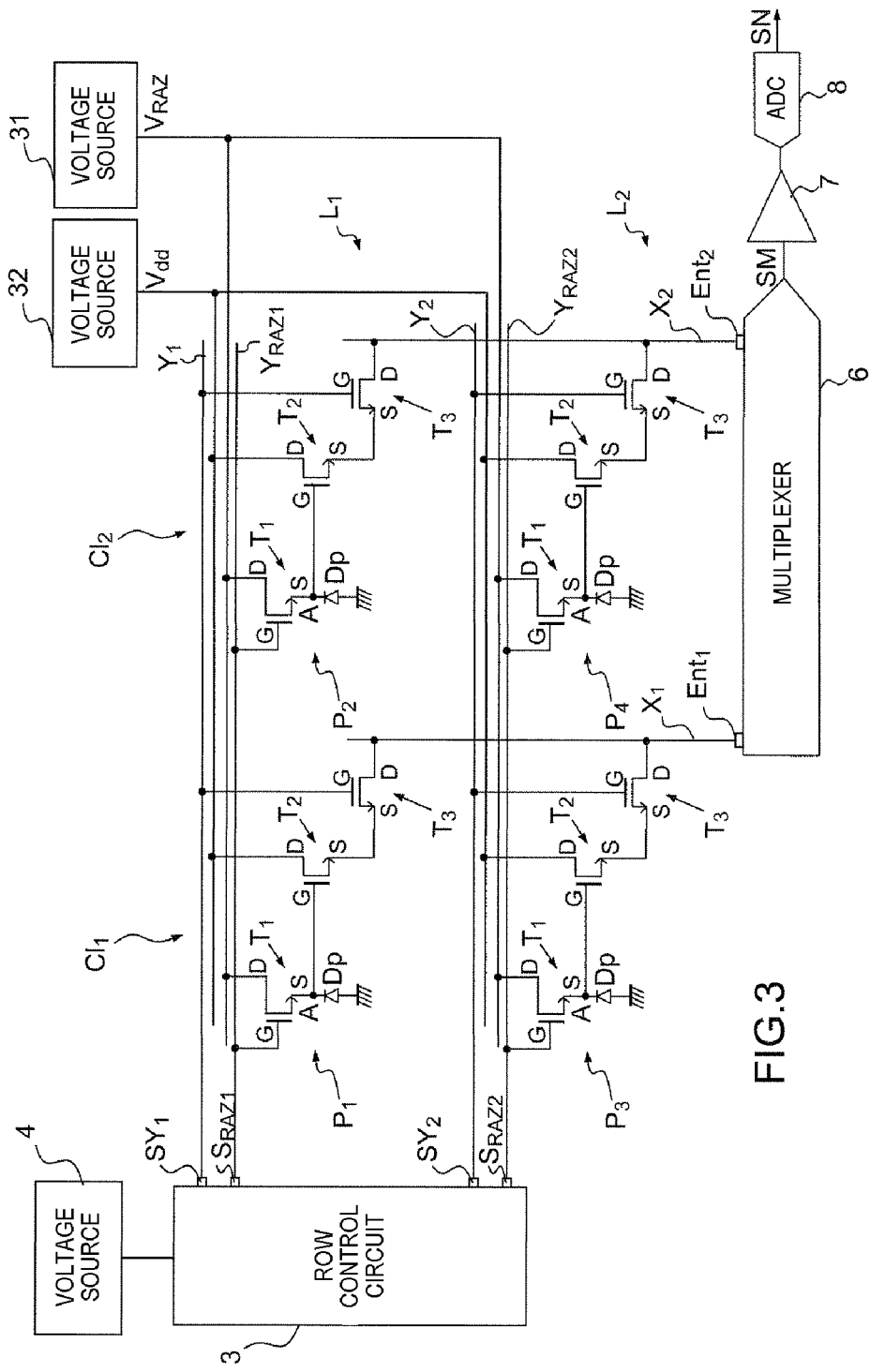
FIG. 3, an exemplary active photosensitive device to which the invention may be applied.

FIG. 3 illustrates a photosensitive device 1" such as this, comprising a matrix 2" of two rows $L_1$ and $L_2$ by two columns $Cl_1$ and $Cl_2$ of photosensitive points $P_1$ to $P_4$. The row control circuit 3 comprises two outputs $SY_1$ and $SY_2$ linked respectively to two row conductors $Y_1$ and $Y_2$. It furthermore comprises two outputs $S_{RTZ1}$ and $S_{RTZ2}$ linked respectively to two reset-to-zero conductors $Y_{RTZ1}$ and $Y_{RTZ2}$. Each photosensitive point $P_1$ to $P_4$ comprises a photodiode Dp and three transistors $T_1$, $T_2$ and $T_3$. The first transistor $T_1$ of each photosensitive point $P_1$ to $P_4$ is linked by its gate G to the reset-to-zero conductor $Y_{RTZ1}$ or $Y_{RTZ2}$ of the row $L_1$ or $L_2$ to which the photosensitive point $P_1$ to $P_4$ considered belongs, by its drain D to a voltage source 31 subjecting the drain D to a reset-to-zero potential $V_{RTZ}$ and by its source S to the cathode of the photodiode Dp belonging to the photosensitive point $P_1$ to $P_4$ considered. The anodes of all the photodiodes Dp are linked to a common potential, for example ground. The same point A may be defined between the source S of the transistor $T_1$ and the cathode of the photodiode Dp. This point A is moreover linked to the gate G of the second transistor $T_2$ of the same photosensitive point $P_1$ to $P_4$. The source S of this transistor $T_2$ is linked to the source S of the third transistor $T_3$ of the same photosensitive point $P_1$ to $P_4$ and the drains D of all the transistors $T_2$ are linked to a voltage source 32 subjecting the drains D to a supply potential $V_{dd}$. The third transistor $T_3$ of each photosensitive point $P_1$ to $P_4$ is moreover linked by its gate G to the row conductor $Y_1$ or $Y_2$ of the row $L_1$ or $L_2$ to which the photosensitive point $P_1$ to $P_4$ considered belongs and by its drain D to the column conductor $X_1$ or $X_2$ of the column $Cl_1$ or $Cl_2$ to which the photosensitive point $P_1$ to $P_4$ considered belongs.

The transistors $T_1$ make it possible to reset the photosensitive points $P_1$ to $P_4$ to their original state, that is to say to the state that they had before being exposed to radiation. More particularly, the transistors $T_1$ make it possible, when a reset-to-zero pulse is dispatched by the row control circuit 3 on a reset-to-zero conductor $Y_{RTZ1}$ or $Y_{RTZ2}$, to return the potential of the point A of all the photosensitive points $P_1$ to $P_4$ of the row $L_1$ or $L_2$ considered to the starting potential, in this instance the reset-to-zero potential $V_{RTZ}$. The transistors $T_2$ make it possible to isolate the points A of the column conductors $X_1$ and $X_2$. The transistors $T_3$ make it possible to link the sources S of the various transistors $T_2$ to the column conductors $X_1$ or $X_2$ to which the corresponding transistors $T_3$ are linked.

The reading of the photosensitive points $P_1$ to $P_4$ is also performed row by row. The row control circuit 3 applies a reading pulse successively to each row conductor $Y_1$ and $Y_2$. The voltages at the point A of the photosensitive points $P_1$ to $P_4$ belonging to the row $L_1$ or $L_2$ which is read are then copied over onto the column conductors $X_1$ and $X_2$ by way of the transistors $T_2$.

In contradistinction to the photosensitive devices 1 and 1' of FIGS. 1 and 2, the photosensitive device 1" does not comprise any integrator circuit, the charges accumulated at the point A being voltage-integrated at the level of the transistors $T_2$. The column conductors $X_1$ and $X_2$ are linked directly to the inputs $Ent_1$ and $Ent_2$ of the multiplexer 6. The multiplexer 6 delivers as output a multiplexed signal SM which can also be amplified by a video amplifier 7 and digitized by an analogue-digital converter 8 so as to provide a digital signal SN.

FIG. 3 is offered with reference to a photosensitive device 1" comprising just two rows and two columns of photosensitive points. Of course, the invention applies to matrices of much bigger capacity. Furthermore, each photosensitive point can comprise more than three transistors and the supply voltage $V_{dd}$ and the reset-to-zero voltage $V_{RTZ}$ can differ for each photosensitive point.

In the photosensitive devices 1, 1' and 1" of FIGS. 1 to 3, it is considered that the charges are accumulated during exposure of the photosensitive points $P_1$ to $P_9$ by photodiodes Dp. However, these charges may be accumulated by any photosensitive element, for example phototransistors.

Figure 4:
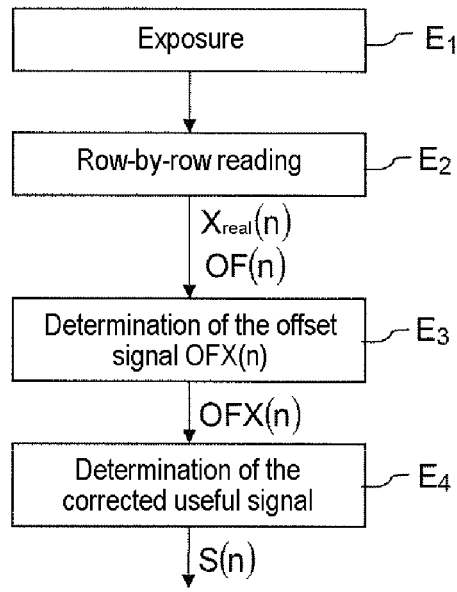
FIG. 4, possible steps for the method of correction according to the invention.

FIG. 4 illustrates possible steps for the method of correction according to the invention. The method of correction is applied for example to an image obtained by one of the photosensitive devices 1, 1' and 1" described with reference to FIGS. 1 to 3. It can comprise a first step $E_1$ of acquiring an image in the course of which each photosensitive point $P_1$ to $P_9$ may accumulate charges on account of an exposure of the matrix 2, 2' or 2" to useful luminous radiation. This luminous radiation originates for example from a scintillator receiving X rays that have passed through a part of the body of a patient for whom it is desired to obtain a radiological image. The method of correction comprises a second step $E_2$ of row-by-row reading of signals representative of the charges accumulated at each photosensitive point $P_1$ to $P_9$. Stated otherwise, the signals of one and the same row are read simultaneously for all the columns $Cl_1$ to $Cl_3$ of the matrix 2, 2' or 2". The signals are read at instants $t=2n$ and $t=2n+1$, with n an integer lying between O and N−1 where N is an integer lying between 2 and the number of rows Nl of the matrix 2, 2' or 2". A determined duration $T_{sampling}$ separates two successive reading instants t and t+1. According to the invention, the signals that are read at the instants $t=2n$ represent the charges accumulated at the various photosensitive points $P_1$ to $P_9$ during step $E_1$. These signals are called useful signals. The signals that are read at the instants $t=2n+1$ represent the charges accumulated between the instants $t=2n$ and $t=2n+1$ in the absence of exposure to radiation. These signals are called offset signals. The principle consisting in acquiring a useful signal and an offset signal successively for each row is known by the term correlated double sampling. The useful signals and the offset signals are for example constructed on the basis of the digital signal SN arising from the analogue-digital converter 8. The useful signals and the offset signals are thereafter considered column by column. This column-by-column processing makes it possible notably to take into account the fact that an electromagnetic disturbance does not necessarily have a uniform effect on the whole of the matrix. For each column $Cl_1$ to $Cl_3$ of the matrix 2, 2' or 2", the useful signals form a discrete signal $X_{real}(n)$ and the offset signals form a discrete signal $OF(n)$. In a third step $E_3$, for each signal $OF(n)$ corresponding to a column $Cl_1$ to $Cl_3$ of the matrix 2, 2' or 2", a signal $OFX(n)$ which would have been formed by the offset signals if they had been read at the instants $t=2n$ is determined. These signals $OFX(n)$, called dummy offset signals, are determined by correcting the signals $OF(n)$. They represent the quantities of charges accumulated in the photosensitive points at the instants of reading of the useful signals but in the absence of exposure of the matrix 2, 2' or 2" to useful luminous radiation. Stated otherwise, they correspond to the offset signals at the reading instants $t=2n$. Some of the charges accumulated in the photosensitive points may be generated on account of an electromagnetic disturbance. If this is the case, the share of amplitude of each signal $X_{real}(n)$ corresponding to the quantity of charges of electromagnetic origin will be identical to the corresponding share of amplitude of each signal $OFX(n)$. In a fourth step $E_4$, the signal $OFX(n)$ is subtracted column by column from the signal $X_{real}(n)$ in accordance with the relation:

$$S(n)=X_{real}(n)-OFX(n) \quad (1)$$

where $S(n)$ represents the corrected useful signal of the column $Cl_1$ to $Cl_3$ considered. This relation (1) makes it possible not only to correct the signals $X_{real}(n)$ of the offset signals $OF(n)$, but also of the charges generated on account of an electromagnetic disturbance. Together, the set of corrected useful signals $S(n)$ then makes it possible to construct a corrected image.

Figure 5:
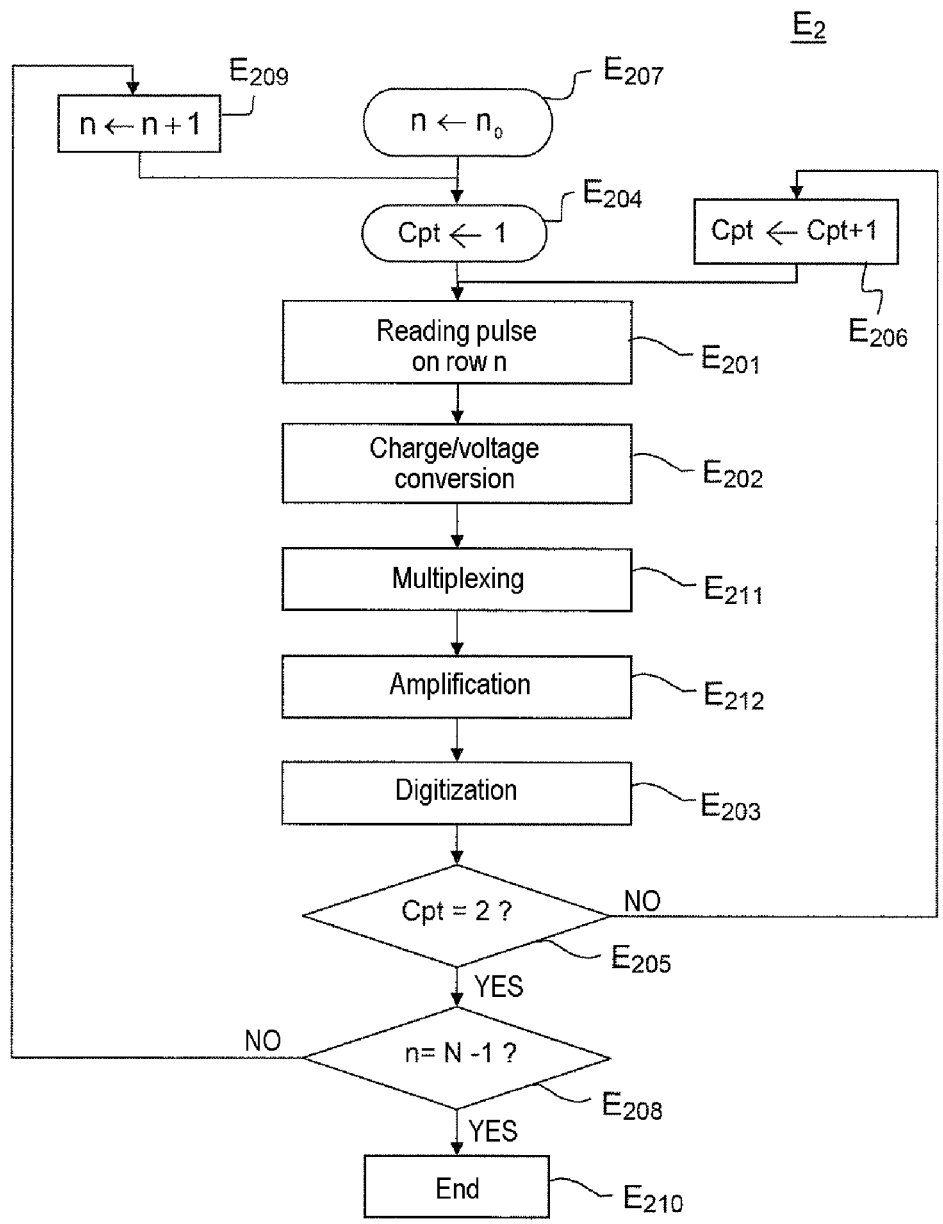
FIG. 5, possible sub-steps for row-by-row reading of charges accumulated in a photosensitive device.

FIG. 5 illustrates a particular form of implementation of step $E_2$ of row-by-row reading. According to this particular form of implementation, step $E_2$ comprises the following successive sub-steps, these sub-steps being repeated successively for each row of the matrix 2, 2' or 2" having to be read: a sub-step $E_{201}$ of reading the charges accumulated at each photosensitive point $P_1$ to $P_9$ of the row considered, a sub-step $E_{202}$ of converting these charges into analogue signals representative of these charges and, a sub-step $E_{203}$ of digitizing these signals. The sub-step $E_{201}$ of reading the charges of a row comprises the dispatching of a reading pulse on the row conductor $Y_1$ to $Y_3$ of the said row. In accordance with the invention, the sub-steps $E_{201}$ to $E_{203}$ are repeated a second time for each row before considering the following row. Thus, the charges read during the first reading at the instants $t=2n$ correspond to the charges accumulated subsequent to exposure of the photosensitive points $P_1$ to $P_9$ to useful luminous radiation during step $E_1$, and the charges read during the second reading at the instants $t=2n+1$ correspond to the charges accumulated in the absence of exposure, in so far as the photosensitive points of the row considered have been reset to their original electrical state prior to the second reading of the charges. This resetting of the photosensitive points to their original electrical state, called resetting to zero, is performed simultaneously in sub-step $E_{201}$ of reading the charges for a photosensitive device comprising passive photosensitive points, such as is represented for example in FIGS. 1 and 2. For a photosensitive device comprising active photosensitive points, such as is represented for example in FIG. 3, the reset to zero may be performed by the dispatching of a reset-to-zero pulse on the reset-to-zero conductor $Y_{RTZ1}$ or $Y_{RTZ2}$ of the row considered.

In a particular mode of implementation, represented in FIG. 5, the repetition of sub-steps $E_{201}$ to $E_{203}$ is performed through the use of a counter Cpt, a value of which indicates a current reading iteration number. In this instance, this counter Cpt takes only two values, for example '1' for the first reading and '2' for the second reading. Sub-step $E_{201}$ can thus be preceded by a sub-step $E_{204}$ of initializing the value of the counter Cpt, for example to the value '1'. On completion of the digitization sub-step $E_{203}$, a test is performed in a sub-step $E_{205}$ to determine whether the value of the counter Cpt is equal to the value '2'. If such is not the case, the value of the counter Cpt is incremented by one unit in a sub-step $E_{206}$ and sub-steps $E_{201}$ to $E_{205}$ are then repeated. If the value of the counter Cpt is equal to the value '2', the following row is then considered so as to be read.

In a particular mode of implementation, represented in FIG. 5, the row-by-row reading is performed through the use of a second counter n, a value of which indicates the number of the current row. Consequently, as indicated previously, the counter n takes integer values lying between 0 and N−1, with N an integer lying between 2 and the number of rows Nl of the matrix 2, 2' or 2". According to this particular mode of implementation, sub-step $E_{201}$ or, if appropriate, sub-step $E_{204}$, is preceded by a sub-step $E_{207}$ of initializing the value of the counter n to the value $n_0$, with $n_0$ an integer lying between 0 and N−2. The integer $n_o$ indicates the number of the first row having to be read, this first row generally corresponding to the first physical row of the matrix 2, 2' or 2". On completion of the digitization sub-step $E_{203}$ or, if appropriate, of sub-step $E_{205}$, a test is performed in a sub-step $E_{208}$ so as to determine whether the value of the counter n is equal to the value N−1. If such is not the case, the value of the counter n is incremented by one unit in a sub-step $E_{209}$ and the method resumes at sub-step $E_{201}$ or, if appropriate, at sub-step $E_{204}$. If the value of the counter n is equal to the value N−1, step $E_2$ of row-by-row reading is terminated in a sub-step $E_{210}$ and the method resumes at sub-step $E_3$.

Still in a particular mode of implementation, step $E_2$ comprises a sub-step $E_{211}$ of multiplexing, either of the analogue signals arising from sub-step $E_{202}$, as represented in FIG. 5, or of the digital signals arising from sub-step $E_{203}$. The multiplexing is for example carried out by the multiplexer 6 represented in FIGS. 1 to 3. Step $E_2$ can also comprise a sub-step $E_{212}$ of amplification. The amplification can notably relate to the analogue signals, the multiplexed signal and/or the digitized signal.

Figure 6:
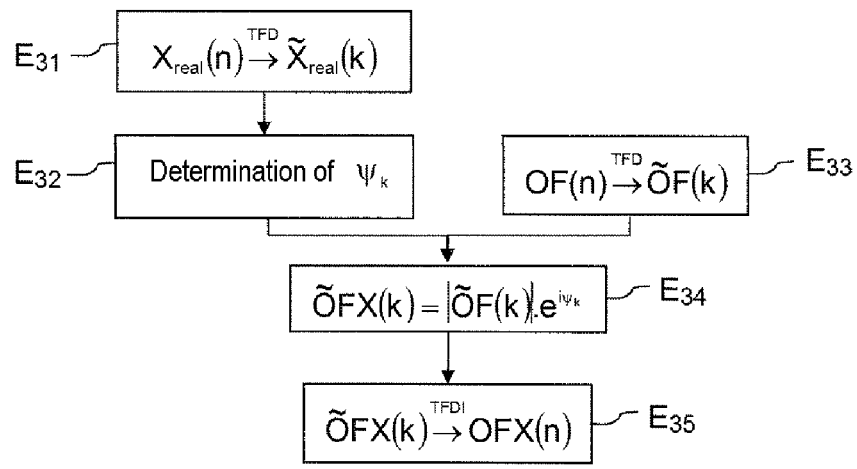
FIG. 6, possible sub-steps for determining offset signals to be subtracted from useful signals.

FIG. 6 illustrates a particular form of implementation of step $E_3$ of determining the signals OFX(n). According to this particular form of implementation, it is sought to determine a "phase" of a disturbance signal that it is sought to delete from the discrete signal $X_{real}(n)$. This disturbance signal obviously being unknown, it is sought to determine a "phase" of the discrete signal $X_{real}(n)$. The phase of a signal can, however, only be defined with respect to a periodic reference function of known frequency. For this purpose, a discrete Fourier transformation of the signals $X_{real}(n)$ is carried out in a sub-step $E_{31}$ so as to yield, for each column of the matrix, a signal $\tilde{X}_{real}(k)$. The signals $\tilde{X}_{real}(k)$ are obtained in accordance with the relation:

$$\tilde{X}_{real}(k) = \sum_{n=0}^{N-1} X_{real}(n) \cdot e^{-i2\pi \frac{k}{N} n}, \quad (2)$$

with k a frequency component index varying from 0 to N−1. In a sub-step $E_{32}$, a phase $\psi_k$ is determined for each nonzero frequency component of each signal $\tilde{X}_{real}(k)$ associated with a column of the matrix in accordance with the relation:

$$\forall k \in [0, N-1], \psi_k = \arg\left(\frac{\tilde{X}_{real}(k)}{|\tilde{X}_{real}(k)|}\right) \text{ if } |\tilde{X}_{real}(k)| \neq 0, \quad (3)$$

In a manner analogous to sub-step $E_{31}$, a discrete Fourier transformation of the signals OF(n) is carried out in a sub-step $E_{33}$ so as to yield, for each column of the matrix, a signal $\tilde{OF}(k)$, in accordance with the relation:

$$\tilde{OF}(k) = \sum_{n=0}^{N-1} OF(n) \cdot e^{-i2\pi \frac{k}{N} n} \quad (4)$$

In a sub-step $E_{34}$, a signal $\tilde{OFX}(k)$ is determined for each signal $\tilde{OF}(k)$ on the basis of the frequency components of the signal $\tilde{OF}(k)$ and of the phases $\psi_k$ of the frequency components of the signals $\tilde{X}_{real}(k)$ in accordance with the relation:

$$\forall k \in [0, N-1], \begin{cases} \tilde{OFX}(k) = |\tilde{OF}(k)| \cdot e^{i\psi_k} & \text{if } |\tilde{X}_{real}(k)| \neq 0 \\ \tilde{OFX}(k) = 0 & \text{if } |\tilde{X}_{real}(k)| = 0 \end{cases} \quad (5)$$

Each signal $\tilde{OFX}(k)$ corresponds substantially to the discrete Fourier transform of the signal OF(n) of the column considered which would have been formed by the offset signals if they had been read at the instants t=2n. Stated otherwise, the signals $\tilde{OFX}(k)$ correspond to the discrete Fourier transforms of the signals OFX(n). Each signal OFX(n) can thus be determined in a sub-step $E_{35}$ by an inverse discrete Fourier transformation of the signal $\tilde{OFX}(k)$ of the column considered, in accordance with the relation:

$$OFX(n) = \frac{1}{N} \sum_{k=0}^{N-1} \tilde{OFX}(k) \cdot e^{i2\pi \frac{k}{N} n} \quad (6)$$

According to a particular form of implementation, for each column $Cl_1$ to $Cl_3$ of the matrix 2, 2' or 2", the signals $X_{real}(n)$ and OF (n) are filtered in the neighbourhood of a frequency $F_N$ determined by the relation:

$$F_N = \frac{1}{2 \cdot (2T_{sampling})} \quad (7)$$

This frequency $F_N$ corresponds to the Nyquist frequency of the sampled signals $X_{real}(n)$ and OF(n). In relation (7), the presence of the second factor ½ is due to the fact that the samples of each signal are spaced apart by a duration $2T_{sampling}$, and not by the duration $T_{sampling}$ because of the double reading on each row.

The invention claimed is:

1. A method for correcting an image obtained by a photosensitive device comprising photosensitive points organized as a matrix of Nl rows by Nc columns, each photosensitive point configured to accumulate charges during exposure to luminous radiation, the method comprising:
   reading, row-by-row, at instants t=2n and t=2n+1 of signals representative of the charges accumulated at each n photosensitive point, where n being an integer lying between 0 and N−1, where N is an integer lying between 2 and the number Nl of rows of the matrix, the signals of one and the same row being read simultaneously, a determined duration $T_{sampling}$ separating two successive reading instants, the signals read at the instants t=2n being called useful signals representing the charges accumulated at the various photosensitive points subsequent to exposure of these points to useful luminous radiation, the signals that are read at the instants t=2n+1 being called offset signals representing the charges accumulated at the various photosensitive points in the absence of exposure to radiation, the useful signals forming discrete signal $X_{real}(n)$ for each column of the matrix and the offset signals forming discrete signal OF(n) for each column of the matrix;
   determining, for each discrete signal OF(n) corresponding to a column of the matrix, a signal OFX(n) representing the charges accumulated at the photosensitive points readable at the instants t=2n in the absence of exposure to radiation, the signals OFX(n) being determined by correcting the discrete signals OF(n); and subtracting, for each column of the matrix, the signal OFX(n) from the corresponding signal $X_{real}(n)$.

2. The method according to claim 1, wherein the row-by-row reading comprises, for each row:
  reading the charges accumulated at each photosensitive point of the row considered subsequent to exposure of the photosensitive points to luminous radiation,
  converting the read charges subsequent to exposure into analogue signals representative of the read charges subsequent to exposure,
  digitizing the analogue signals representative of the read charges subsequent to exposure,
  reading the charges accumulated at each photosensitive point of the said row subsequent to a reset of the said photosensitive points to their original electrical state,
  converting the read charges subsequent to the reset into analogue signals representative of the read charges subsequent to the reset, and
  digitizing the analogue signals representative of the read charges subsequent to the reset.

3. The method according to claim 1, wherein determining the signal OFX(n) comprises, for each column of the matrix:
  performing a discrete Fourier transformation of the signal $X_{real}(n)$ into a signal $\tilde{X}_{real}(k)$, where k is a frequency component index varying from 0 to N−1,
  determining a phase $\psi_k$ for each nonzero frequency component of the signal $\tilde{X}_{real}(k)$,
  performing a discrete Fourier transformation of the signal OF(n) into a signal $\tilde{OF}(k)$,
  determining, based on the frequency components of the signal $\tilde{OF}(k)$ and of the phases $\psi_k$ of the frequency components of the signal $\tilde{X}_{real}(k)$, a signal $\tilde{OFX}(k)$ based on the relation:

$$\forall k \in [0, N-1], \begin{cases} \tilde{OFX}(k) = |\tilde{OF}(k)| \cdot e^{i\psi_k} & \text{if } |\tilde{X}_{real}(k)| \neq 0 \\ \tilde{OFX}(k) = 0 & \text{if } |\tilde{X}_{real}(k)| = 0, \end{cases}$$

and determining the signal OFX(n) by performing an inverse discrete Fourier transformation of the signal $\tilde{OFX}(k)$.

4. The method according to claim 1, wherein, for each column of the matrix, the signals $X_{real}(n)$ and OF(n) are filtered around a frequency $F_N$ determined by the relation:

$$F_N = \frac{1}{2 \cdot (2T_{sampling})}.$$

* * * * *